United States Patent
Isaksen et al.

(10) Patent No.: US 7,012,972 B1
(45) Date of Patent: Mar. 14, 2006

(54) MINIMIZATION OF PHASE EQUIVOCATION IN BURST MODEMS

(75) Inventors: David Bruce Isaksen, Mountain View, CA (US); Byron Esten Danzer, Aptos, CA (US); Mark Fong, Cupertino, CA (US)

(73) Assignee: Wideband Semiconductors, Inc., Mountain View, CA (US)

( * ) Notice: Subject to any disclaimer, the term of this patent is extended or adjusted under 35 U.S.C. 154(b) by 865 days.

(21) Appl. No.: 10/134,245

(22) Filed: Apr. 27, 2002

(51) Int. Cl.
*H04L 27/14* (2006.01)

(52) U.S. Cl. ..................................... 375/326; 375/346

(58) Field of Classification Search ........ 375/219–223, 375/324–327, 346, 371, 375, 376; 331/1 R; 329/302, 306–310
See application file for complete search history.

(56) References Cited

U.S. PATENT DOCUMENTS

| | | | |
|---|---|---|---|
| 5,638,361 A * | 6/1997 | Ohlson et al. | 370/342 |
| 5,706,048 A * | 1/1998 | Davis | 725/62 |
| 5,757,847 A | 5/1998 | Durrant et al. | |
| 6,650,649 B1 * | 11/2003 | Muhammad et al. | 370/402 |
| 6,952,399 B1 * | 10/2005 | Bayerl et al. | 370/229 |

* cited by examiner

*Primary Examiner*—Don N. Vo
(74) *Attorney, Agent, or Firm*—Boris G. Tankhilevich (57) ABSTRACT

In a system comprising a subscriber (sub) carrier tracking loop and a hub carrier tracking loop, a method and apparatus for resolving phase equivocation. The method comprises the following steps: (A) acquiring a phase and a frequency of a hub carrier frequency by utilizing the sub carrier tracking loop; (B) estimating an instant absolute frequency offset between a received symbol point and a corresponding plant point; (C) averaging the instant absolute frequency offset over a plurality of received symbols; (D) storing the averaged estimated frequency offset in a frequency register of the sub carrier tracking loop; (E) locking the sub carrier tracking loop on the hub carrier frequency by compensating for the stored averaged estimated frequency offset; (F) estimating an instant absolute phase error between a received symbol point and a corresponding plant point; (G) averaging the instant absolute phase error over a plurality of received symbols; (H) resolving phase equivocation by adjusting the averaged absolute phase error, if the averaged absolute phase error is at least equal to a predetermined equivocation phase threshold; and (I) completing the tracking of the hub carrier frequency by the locked sub carrier tracking loop.

41 Claims, 4 Drawing Sheets

MINIMIZATION OF PHASE EQUIVOCATION IN BURST MODEMS

BACKGROUND OF THE INVENTION

1. Field of the Invention

The present invention relates to the filed of the digital signal processing, and more specifically, to the field of phase equivocation in burst modems.

2. Discussion of the Prior Art

When the communication exists for a long period of time, it is possible to use a conventional phase-lock loop (PLL) in a receiver to recover the carrier from a continuously transmitted signal. The PLL that is specifically designed to recover the carrier is termed as a phase carrier loop.

However, in a time-division multiple access (TDMA) communication system, the available spectrum is used by letting each user to have access to the whole band for a short time (traffic burst), during which time the user transmits data as fast as the user can. The user's frequency allocation is shared with the other users who have time slots allocated at other times.

Thus, in a TDMA-type burst communication systems, the signals exist for a short period of time. Consequently, there is little time in which the phase carrier loop can slew to the proper phase in order to recover the carrier from the burst signal.

This situation is exacerbated for a TDMA-type burst commination system if the phase of the incoming symbol is very close to the border between the plant points. If this is the case, the slicer in the phase carrier loop can not determine to which quadrant the incoming symbol point having such phase should belong because such symbol can be equally located in either of two quadrants. Such symbol point is further referred to as a symbol point having a phase equivocation, and the phase carrier loop can not lock fast enough on an incoming signal having a phase equivocation characteristic.

What is needed is to design a carrier phase loop system that is capable of resolving the phase equivocation of the incoming symbols, thus placing any incoming symbol point to a certain quadrant for further processing by the loop, thus increasing the speed of locking of the carrier phase loop on the carrier.

SUMMARY OF THE INVENTION

To address the shortcomings of the available art, the present invention provides a method and apparatus for resolving the phase equivocation of the incoming symbols, thus increasing the speed of locking the phase carrier loop on the carrier.

One aspect of the present invention is directed to a method for resolving phase equivocation by a subscriber (sub) carrier tracking loop in a system comprising the sub carrier tracking loop and a hub carrier tracking loop. The hub carrier tracking loop comprises a burst modem, and the sub carrier tracking loop comprises a burst modem. The hub transmits the set of incoming symbols that is received by the sub carrier tracking loop.

In one embodiment, the method for resolving phase equivocation by the sub carrier tracking loop comprises the following steps: (A) acquiring a phase and a frequency of a hub carrier frequency; (B) estimating an instant absolute frequency offset between a received symbol point and a corresponding plant point; (C) averaging the instant absolute frequency offset over a plurality of received symbols; (D) storing the averaged estimated frequency offset in a frequency register of the sub carrier tracking loop; (E) locking the sub carrier tracking loop on the hub carrier frequency by compensating for the stored averaged estimated frequency offset; (F) estimating an instant absolute phase error between a received symbol point and a corresponding plant point; (G) averaging the instant absolute phase error over a plurality of received symbols; (H) resolving phase equivocation by adjusting the averaged absolute phase error, if the averaged absolute phase error is at least equal to a predetermined equivocation phase threshold; and (I) completing the tracking of the hub carrier frequency by the locked sub carrier tracking loop.

In one embodiment, the step (G) of averaging the instant absolute phase error between each received symbol point and the corresponding plant point further includes the step of performing a moving averaging operation over a plurality of N symbol points by using a moving averaging filter after receiving an evaluation command from a host controller. N is an integer.

In one embodiment, if the averaged absolute phase error is at least equal to the predetermined equivocation phase threshold, the step (H) of resolving phase equivocation by adjusting the averaged absolute phase error further includes the following steps of: (H1) determining the-dependent equivocation phase threshold; (H2) making a decision regarding a relationship between the averaged absolute phase error and the predetermined-dependent equivocation phase threshold; and (H3) if the averaged absolute phase error is at least equal to the predetermined equivocation phase threshold, injecting a phase offset signal into the carrier tracking loop in order to shift the phase of each received symbol point away from the phase of a corresponding plant point by the phase offset signal.

In one embodiment, the step (H3) of injecting the offset phase signal further includes the step of injecting a programmable phase offset signal into the carrier tracking loop in order to shift the phase of each received symbol point away from the phase of the corresponding plant point beyond a programmable equivocation phase threshold.

Another aspect of the present invention is directed to a method of fast carrier acquisition of a hub carrier by at least one sub carrier tracking loop in a system comprising the hub carrier tracking loop and at least one sub carrier tracking loop. The hub carrier tracking loop comprises a burst modem, and each sub carrier tracking loop comprises a burst modem.

In one embodiment, the method of fast carrier acquisition of the hub carrier by at least one sub carrier tracking loop further comprises the following steps: (A) performing an initial acquisition of a hub carrier by a first sub carrier tracking loop during a direct burst transmission from the hub carrier tracking loop; (B) performing a subsequent acquisition of the hub carrier during the direct burst transmission by the first sub carrier tracking loop using a first_sub-hub frequency offset determined during the step (A); (C) performing an initial acquisition of the first sub carrier by the hub carrier tracking loop during a reverse burst transmission between the first sub carrier tracking loop and the hub carrier tracking loop; (D) performing a subsequent acquisition of the first sub carrier by the hub carrier tracking loop during the reverse burst transmission between the first sub carrier tracking loop and the hub carrier tracking loop using a hub-first_sub frequency offset determined during the step (C); and (E) repeating the steps (A–D) for each communication between the hub carrier tracking loop and each "k" sub carrier tracking loop. K is an integer greater than one.

In one embodiment, wherein the first sub carrier tracking loop comprises a first sub frequency register, the step (A) of performing the initial acquisition of the hub carrier further includes the steps of: performing an initial frequency estimation of a first_sub-hub frequency offset between the hub carrier and the received hub carrier by the first sub carrier tracking loop; and storing the initial first_sub-hub frequency offset in the first sub frequency register.

In one embodiment, wherein the first sub carrier tracking loop further comprises a first sub frequency accumulator, the step (B) of performing the subsequent acquisition of the hub carrier during the direct burst transmission by the first the sub carrier tracking loop further includes the following steps: (B1) measuring a residual first_sub-hub frequency offset between a subsequent first_sub-hub frequency offset and the initial first_sub-hub frequency offset by using the first sub carrier loop; (B2) storing the residual first_sub-hub frequency offset in the first sub frequency accumulator; and (B3) using the residual first sub-hub frequency offset to resolve phase equivocation for a subsequent direct burst signal transmitted by the hub carrier tracking loop and received by the first sub carrier tracking loop.

In one embodiment, wherein the hub carrier tracking loop comprises a hub frequency register, the step (C) of performing the initial acquisition of the first sub carrier by the hub carrier tracking loop during the reverse burst transmission between the first sub carrier tracking loop and the hub carrier tracking loop further includes the following steps: (C1) measuring an initial hub-first_sub frequency offset between the first sub carrier and the received first sub carrier by the hub carrier tracking loop; and (C2) storing the initial hub-first_sub frequency offset in the hub frequency register.

In one embodiment, the step (C1) of performing the initial frequency estimation of the hub-first_sub frequency offset further includes the step of using a differential symbol phase measurement technique. In an alternative embodiment, the step (C1) of performing the initial frequency estimation of the hub-first_sub frequency offset further includes the steps of: (C1; 1) performing a nonlinear operation to raise the first sub carrier signal into "$\aleph$" power, in order to obtain a nonlinear $\aleph$_first sub carrier signal; and (C1; 2) performing a Fast Fourier Transform (FFT) on the nonlinear $\aleph$_first_ sub_carrier signal. "$\aleph$" is equal to the number of plant points in the first sub QAM constellation.

In one embodiment, wherein the hub carrier tracking loop comprises a hub frequency accumulator, the step (D) of performing the subsequent acquisition of the first sub carrier by the hub carrier tracking loop during the reverse burst transmission between the first sub carrier tracking loop and the hub carrier tracking loop further includes the following steps: (D1) measuring a residual hub-first_sub frequency offset between a subsequent hub-first_sub frequency offset and the initial hub-first_sub frequency offset by using the hub carrier loop; (D2) storing the residual hub-first_sub frequency offset in the hub frequency accumulator; and (D3) using the residual hub-first_sub frequency offset to resolve phase equivocation for a subsequent reverse burst signal transmitted by the first sub carrier tracking loop and received by the hub carrier tracking loop. The steps (D1–D3) are preferably repeated for each "k" sub carrier tracking loop transmitting a reverse burst signal to the hub carrier tracking loop. k is an integer greater than one.

In one embodiment, a network management system is utilized to transmit a protocol for each sub carrier tracking loop and for the hub carrier tracking loop. The protocol sets the precise timing parameters for each direct burst communication between the hub carrier tracking loop and each sub carrier tracking loop, and the protocol sets the precise timing parameters for each reverse burst communication between each sub carrier tracking loop and the hub carrier tracking loop, so that the reverse burst signals from each sub carrier tracking loop to the hub carrier tracking loop do not overlap in time.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
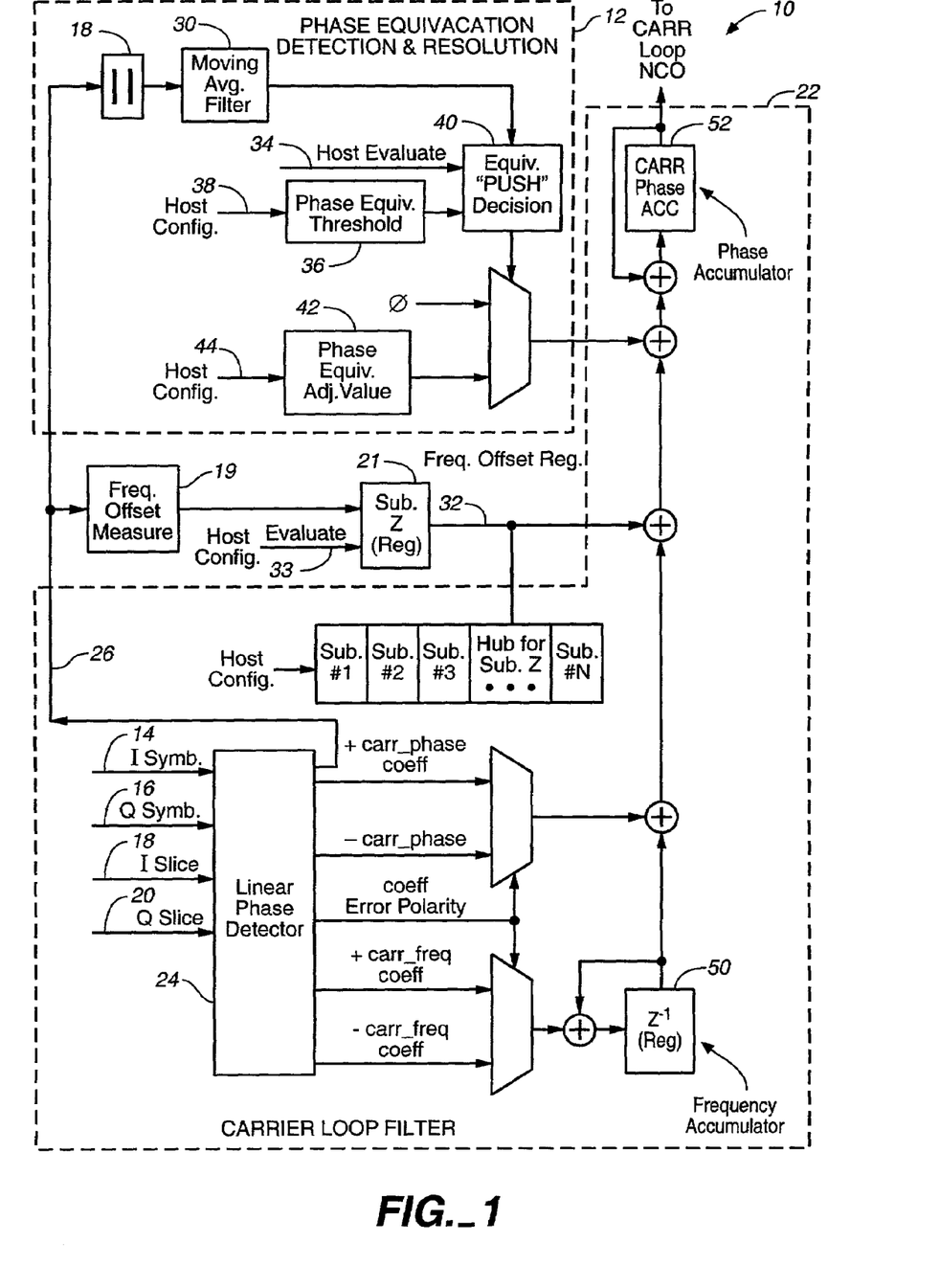
FIG. 1 depicts a subscriber (sub) carrier tracking loop of the present invention including a phase equivocation detection and resolution circuit.

FIG. 1 depicts a subscriber (sub) carrier tracking loop 10 of the present invention including a phase equivocation detection and resolution circuit 12. The sub carrier tracking loop 10 is configured to receive from the hub (not shown) a set of Inphase components 14 and Quadrature components 16 of incoming burst symbols. In addition, the sub carrier loop 10 is also configured to receive from the slicer (not shown) the set of Inphase components 18 and Quadrature components 20 the plant points.

A good example of a burst communication system is a time-division multiple access (TDMA) communication system, whereas the available spectrum is used by letting each user to have access to the whole band for a short time (traffic burst), during which time the user transmits data as fast as the user can. The user's frequency allocation is shared with the other users who have time slots allocated at other times. Thus, in a TDMA-type burst communication systems, the signals exist for a short period of time, and there are severe time constraints placed on a receiver phase carrier tracking loop to react, that is to lock on the incoming signal. However, if the phase of the incoming symbol is very close to the border between the plant points, the slicer in the phase carrier loop can not determine to which quadrant the incoming symbol point having such phase should belong because such symbol can be equally located in either of two quadrants. Such symbol point is further referred to as a symbol point having a phase equivocation, and the phase carrier loop can not lock fast enough on an incoming signal having a phase equivocation characteristic.

Figure 2:
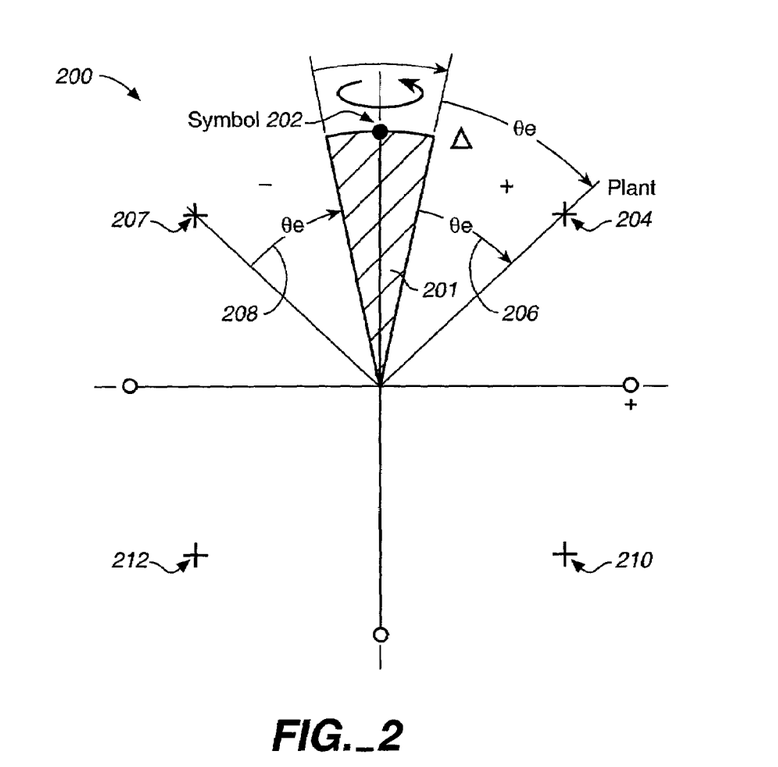
FIG. 2 illustrates the phase equivocation of an incoming point that is equally distanced from two nearest plant points.

The phase equivocation situation is illustrated in FIG. 2 for the simplest case-QPSK modulation wherein there are only 4 plant points 206, 204, 212, and 210. The incoming symbol 202 is placed right on the borderline 210, or is equally distanced from two nearest plant points 206 and 204, that is the angles $\theta_e^-$ (208) and $\theta_e^+$ (206) are equal. Therefore, the phase tracking loop is unable to resolve the phase of the incoming symbol 202 fast enough.

Figure 3A:
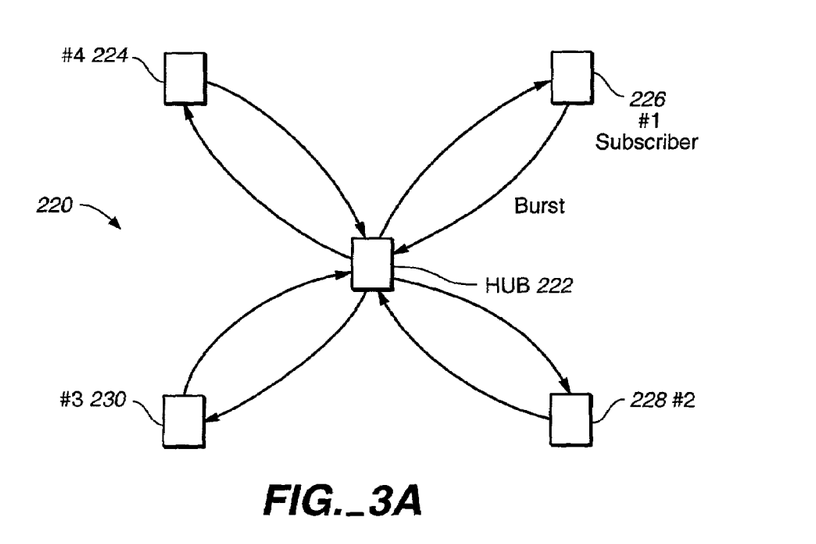
FIG. 3A depicts a topology of hub-multi-sub burst communication, wherein the phase equivocation (or ambiguity) of an incoming symbol occurs due to imperfect references, or phase offset between the hub and at least one sub tracking loop.

FIG. 3A depicts a topology of hub-multi-sub burst communication, wherein the phase equivocation (or ambiguity) of an incoming symbol occurs due to imperfect references, or phase offset between the hub 222 and at least one sub tracking loop (224, 226, 230, or 228).

For example, if a first sub carrier tracking loop comprises a QAM first sub carrier tracking loop, and if a hub carrier tracking loop further comprises a QAM hub carrier tracking loop, and if QAM constellation comprises a QPSK constellation, a sub (224, 226, 230, or 228) can be in phase with the hub 222, or out of phase. The phase offset can occur when the spatial distance between the sub receiver and hub transmitter is unknown, or when the spatial distance between sub and hub changes dynamically due to a mobile hub, or due to a mobile sub, or due to both sub and hub being mobile ones.

Figure 3B:
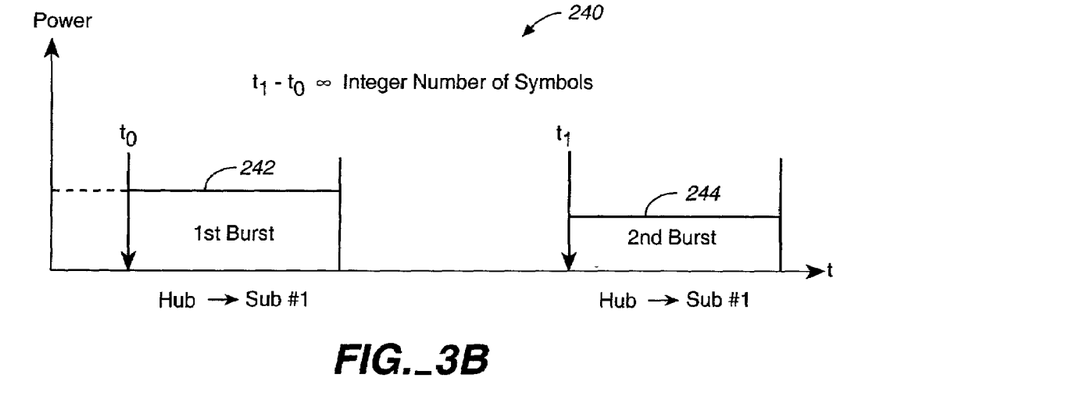
FIG. 3B illustrates the phase equivocation (or ambiguity) of an incoming symbol that is due to non-integral symbol distance between two consecutive bursts between the hub (of FIG. 3A), and one particular sub, for instance, the sub #1 (of FIG. 3A).

In one embodiment, as depicted in FIG. 3B, the phase equivocation (or ambiguity) of an incoming symbol occurs due to non-integral symbol distance between two consecutive bursts 242 and 244 between the hub 22 (of FIG. 3A), and one particular sub, for instance, the sub #1 226 (of FIG. 3A):

$$t_1 - t_0 \neq \text{Integer Number of Symbols}; \quad (1)$$

wherein $t_1$ is the start time for the burst #2 (244), and $t_0$ is the start time for the burst #1 (242). If this is the case, the subsequent burst would be out of phase of the preceding burst, and the sub carrier tracking loop has to find out the phase offset between two consecutive bursts.

Figure 3C:
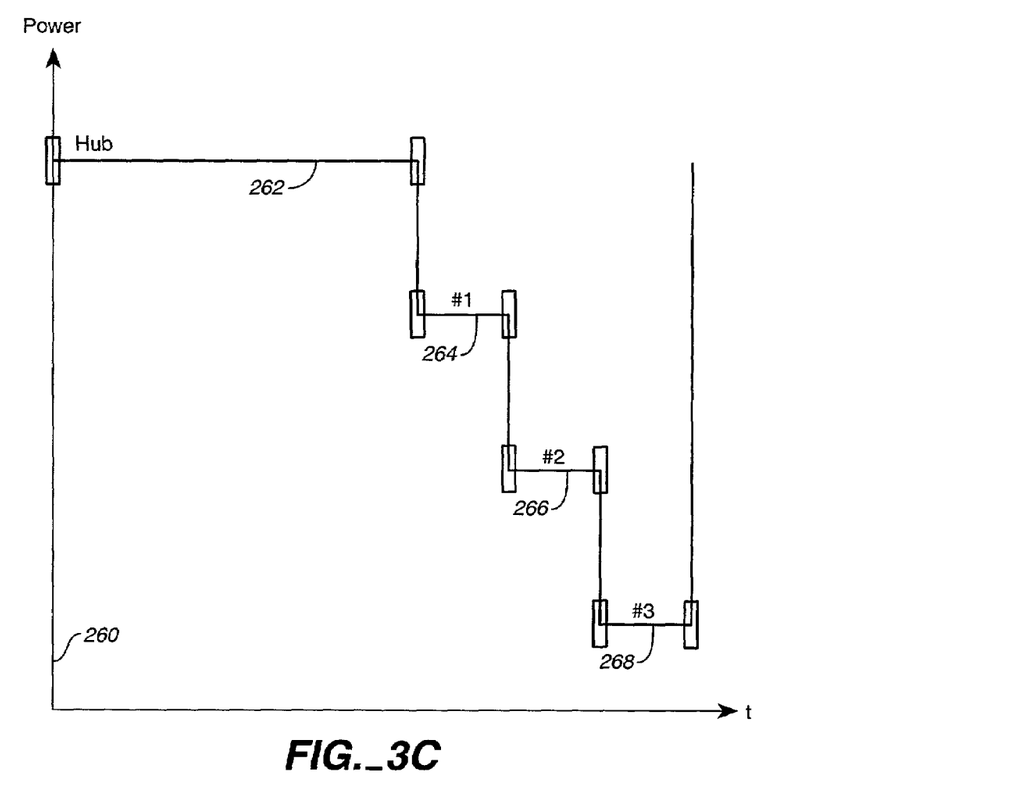
FIG. 3C shows the time diagram of the direct burst communication in the topology of FIG. 3A between the hub and sub #1, sub #2, sub #3, and sub #4.

For a continuous broadcast situation, the phase ambiguity, or phase equivocation of the incoming symbols, is not a problem because the sub's tracking loop would lock eventually on each incoming symbol, sooner or later. On the other hand, FIG. 3C illustrates time diagram of the direct burst communication between the hub 222 and sub #1 (262), sub #2 (264), sub #3 (266), and sub #4 (268) in the burst communication system topology as illustrated in FIG. 3A. If this is the case, each sub has only a limited time to lock on the incoming signal, before hub 222 starts transmitting to another sub. Preferably, during the burst transmission, the sub has time equal about 100 symbols time periods to lock on the hub carrier.

To synchronize all subs and hub one should provide every single sub with the same hub reference frequency. It can be done by providing each sub with the VCXO (voltage control crystal oscillator), or TCXO (temperature control crystal oscillator).

Figure 4:
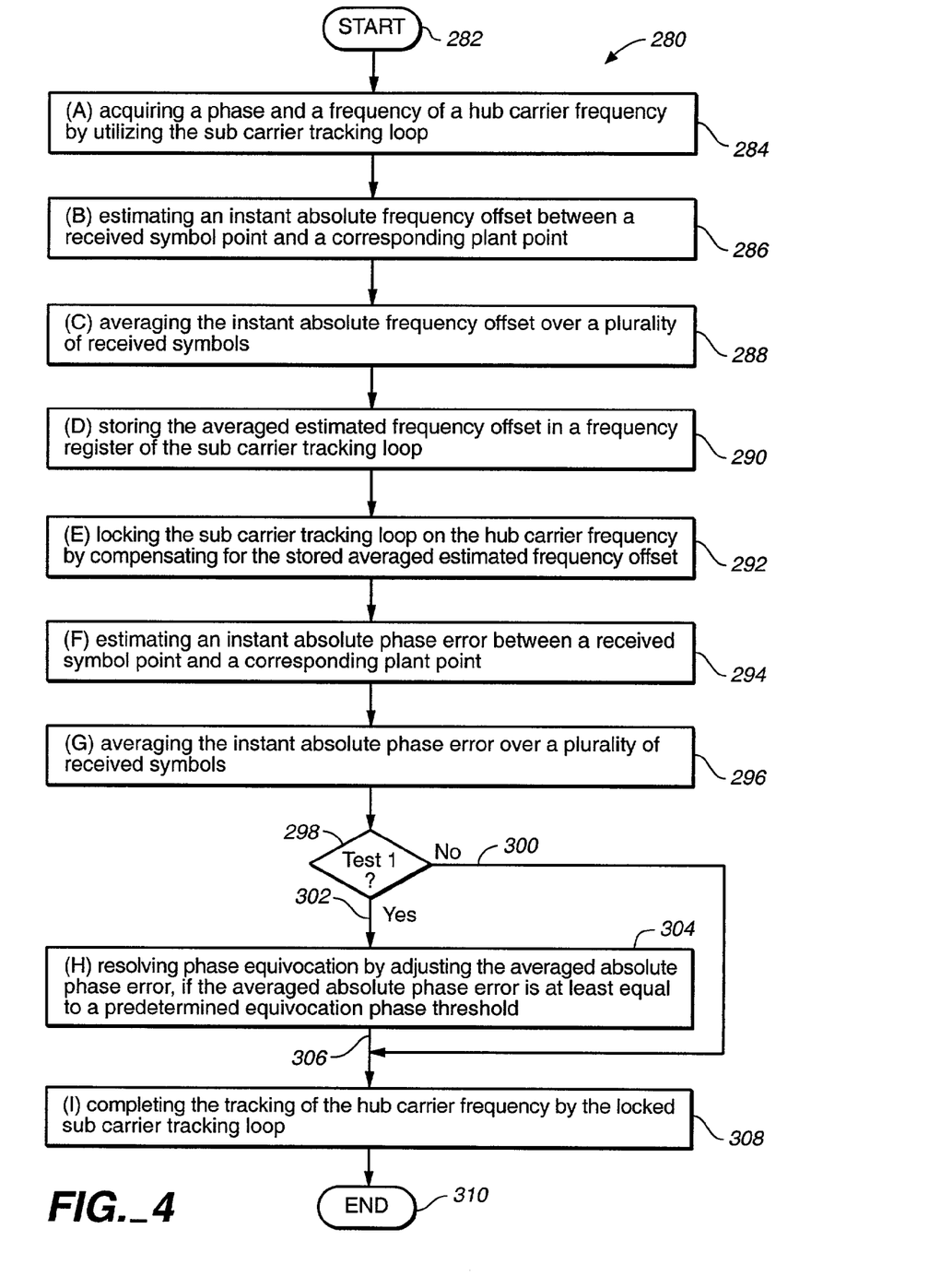
FIG. 4 is a flow chart of the method of the present invention for resolving of the phase equivocation of the incoming from the hub symbols by utilizing the sub carrier tracking loop of FIG. 1.

FIG. 4 is a flow chart 220 of the method of the present invention for resolving the phase equivocation of the incoming from the hub (222 of FIG. 3A) symbols by utilizing the sub #1 (226 of FIG. 3A) carrier tracking loop of FIG. 1. This results (as it is shown below) in the sub #1 tracking loop being locked on the incoming from the hub burst signal fast enough so that it could track the hub carrier frequency during the time period (262 of FIG. 3C) that hub uses for its direct burst transmission to sub #1.

The first step (224 of FIG. 3) is the step of acquiring a phase and a frequency of a hub carrier frequency by utilizing the sub carrier tracking loop filter. The U.S. patent application entitled "LINEAR PHASE ROBUST CARRIER RECOVERY FOR QAM MODEMS", Ser. No. 09/981,085, is incorporated by reference herein in its entirety, and hereafter is referred to as patent application #1. The patent application # 1 provides a detailed enablement embodiment of the QAM carrier loop filter that is capable of acquiring the phase and the frequency of the hub QAM carrier frequency. In addition, block 22 of FIG. 1 illustrates the QAM carrier loop filter that is used in the present invention.

The patent application #1 discloses the carrier tracking loop filter including an adaptive equalizer that performs the following steps: sampling a QAM signal received from a transmission channel; recovering a symbol clock function from the sampled QAM signal; applying the sampled QAM signal to the adaptive equalizer in order to obtain a QAM equalized signal in a Blind Equalization (BE) mode; using a slicer to locate a nearest plant point for the QAM Blind equalized signal for each recovered symbol clock; using a phase detector to obtain an instantaneous Inphase component and an instantaneous quadrature component of a phase angle error signal by comparing an inphase component and a quadrature component of the QAM Blind equalized signal and an inphase and a quadrature component of the nearest plant point for each symbol clock; and using a complex conjugate multiplier and a linear phase estimator to translate the inphase component and the quadrature component of the phase angle error signal into an instantaneous phase angle error for each symbol clock. All these operations are performed by the block linear phase detector 24.

In one embodiment, at the same time when the carrier loop acquires the phase and frequency of the hub carrier, the symbol timing is also acquired. In another embodiment, the symbol timing can be acquired when no signal is transmitted from the hub, that is during the burst off time. If this is the case, the zero error is added in to the frequency offset register 32.

If the burst transmission is on, after the phase and frequency of a hub carrier are acquired (step 284 of FIG. 4), the instant absolute frequency offset between the received symbol point and a corresponding symbol point is estimated (step 286 of FIG. 4), and the averaging operation is performed (step 288 of FIG. 4)) in Blind Equalization Mode using the frequency offset measurement block 19. At the next step (290) the averaged estimated frequency offset is stored in a frequency register 32 of the sub carrier tracking loop 10 under the control signal 33 of the host controller (not shown).

After the received hub carrier is compensated for the frequency offset, the rotation of the constellation is stopped, and the lock is achieved (step 292 of FIG. 4). Simultaneously with acquiring lock, the instant carrier phase error signal is evaluated (not shown) and is sent to the block 28 (of FIG. 1) that estimates an instant absolute phase offset between a received symbol point and a corresponding plant point. This is the step (294) of FIG. 4.

At the step (296), the instant absolute phase offset is averaged over the plurality of last N received symbols, N is an integer, by using the moving averaging filter 30 (of FIG. 1) after receiving an evaluation command 34 from a host controller (not shown). In one embodiment, the moving average filter can be implemented using an infinite impulse response (IIR) filter. In another embodiment, the moving average filter can be implemented using a finite impulse response (FIR) filter. In one embodiment, N is in the range of (8–30) symbols.

In one embodiment, if the averaged absolute phase error is at least equal to a predetermined equivocation phase threshold:

$$<Abs\ (phase\ error)>_{N=(8-30)} \geq Equivocation\_Phase\_Threshold; \quad (2)$$

that is the test condition (298 of FIG. 4) is satisfied, and the next step (following the logical arrow 302) is the step (304) of resolving phase equivocation by adjusting the averaged absolute phase error. In this embodiment, if and after the phase equivocation is resolved (see discussion below), the tracking of the hub carrier frequency by the locked sub carrier tracking loop (10 of FIG. 1) is completed fast enough, that is within the duration (262 of FIG. 3C) of the burst communication signal from the hub.

In another embodiment, if there is no phase equivocation, the test condition (298 of FIG. 4) fails, the next step (following the logical arrow 300) is the step (308) of completing the tracking of the hub carrier frequency by the locked sub carrier tracking loop (10 of FIG. 1). This step in the absence of the phase equivocation is completed fast enough and does not require the usage of the phase equivocation circuitry 12 of the present invention.

In one embodiment, if the test condition (Eq. 2) is satisfied, the step of resolving phase equivocation (304) is performed by adjusting the averaged absolute phase error. However, prior to this step, the equivocation phase threshold should be determined. The equivocation phase threshold is constellation dependent, that is for different constellation, the threshold is different. The phase equivocation threshold is limited:

$$Equivocation\_Phase\_Threshold \leq \pi/4. \quad (3)$$

In one embodiment, the equivocation threshold determination can be done by using a host command 38 in the block phase equivocation threshold 36 (of FIG. 1). In another embodiment, the equivocation threshold can be made programmable by using the host command 38 in the programmable phase equivocation threshold block 36 (of FIG. 1). The test condition (Eq. 2) is tested in block 40.

In one embodiment, if the averaged absolute phase error is at least equal to the predetermined equivocation phase threshold, that is the test condition (Eq. 2) is satisfied, a phase offset signal is injected into the phase equivocation block 12 by using the phase equivocation adjustable value block 42 under the control signal 44 of the host controller (not shown) in order to shift the phase of each received symbol away from the border line 201 (of FIG. 2) beyond the predetermined equivocation phase threshold.

In another embodiment, a programmable phase offset signal is injected into the phase equivocation block using the same block 42 under the control signal 44 in order to shift the phase of each received symbol point away from the phase of the corresponding plant point beyond the programmable equivocation phase threshold.

The flow chart 280 of FIG. 4 discloses the acquisition and tracking of the initial direct burst transmission from the hub by one of the sub carrier tracking loops, as depicted in the topology 220 of FIG. 3A.

In one embodiment, the sub carrier tracking loop can keep substantially precise hub carrier timing by acquiring the clock from the hub when the sub locks on the hub carrier during the initial direct burst transmission from the hub to the sub. If this is the case, the sub and hub can exchange the direct and burst back transmissions in the following manner. The hub carrier tracking loop is substantially the same as the sub carrier tracking loop 10 of FIG. 1. The only difference is the hub frequency register block 48 that replaces the sub frequency register block 32. The hub frequency register 48 includes the memory sufficient to keep track of frequency offsets for all active subs that communicate with the hub.

In one embodiment, after performing an initial acquisition of a hub carrier by a first sub carrier tracking loop during a direct burst transmission from the hub carrier tracking loop, as was disclosed above, the same sub performs a subsequent acquisition of the hub carrier during the direct burst transmission by the first sub carrier tracking loop using the same frequency offset that was determined and stored in the frequency offset block 32 during the initial acquisition of the direct burst transmission from the hub. However, the residual frequency offset is determined by the sub carrier tracking loop 10 and stored in the block frequency accumulator 50. Please, see discussion below.

In one embodiment, after the locking on and tracking the hub carrier during the initial and subsequent burst transmissions from the hub by the fist sub, the first sub bursts back, and this initial and subsequent burst back from the first sub are acquired by the hub carrier tracking loop 10 (of FIG. 1), wherein the hub tracking loop locks on the first sub carrier and tracks the first sub carrier. These steps are substantially the same as the steps performed by the sub tracking loop, they are depicted in the flow chart 280 of FIG. 4, and are incorporated by reference herein.

More specifically, while performing a subsequent acquisition of the first sub carrier by the hub carrier tracking loop during the reverse burst transmission from the first sub, the hub carrier loop uses the hub-first_sub frequency offset determined during the initial acquisition of the first sub carrier during the initial burst back transmission. This frequency offset is stored in the block 48 of FIG. 1. These steps are preferably repeated for each communication between the hub carrier tracking loop and each "k" sub carrier tracking loop. K is an integer greater than one. In the topology depicted in FIG. 3A, the hub communicates with sub #2 (228), sub #3 (230), and sub #4 (224), so that k=4.

In one embodiment, the step of performing the initial frequency estimation of the first_sub-hub frequency offset is done by using a differential symbol phase measurement technique disclosed in the patent application #1.

In another embodiment, the step of performing the initial frequency estimation of the first_sub-hub frequency offset is done by performing the following steps: (1) performing a nonlinear operation to raise the hub carrier signal into "ℵ" power, in order to obtain a nonlinear ℵ_first_sub_carrier signal; and (2) performing a Fast Fourier Transform (FFT) on the nonlinear ℵ_first_sub_carrier signal. "ℵ" is equal to the number of plant points in the first sub QAM constellation.

In one embodiment, whereas there is sufficient number of symbols in the first sub PREAMBLE, the prior modulation doesn't affect the FFT operation itself because the first sub constellation has enough symbols so that the hub circuitry can make a meaningful decision.

In an alternative embodiment, whereas the sufficient number of symbols in the first sub PREAMBLE is lacking, to perform a meaningful FFT operation the hub circuitry needs to perform a nonlinear operation first to get rid of modulation and to remove the first sub carrier and to remove all the phase data and to collapse all first sub symbols into one energy peak which would allow the FFT to perform a fast and meaningful first sub carrier frequency determination.

In one embodiment, the nonlinear operation to raise the first sub carrier signal into "ℵ" power is performed by using a multiplier (not shown).

For example, if the first sub carrier tracking loop comprises a QAM first sub carrier tracking loop, and if the hub carrier tracking loop further comprises a QAM hub carrier tracking loop, and if the symbol constellation comprises a QPSK constellation, ℵ=4, and the first sub carrier signal is raised into "ℵ=4" power by using a complex multiplier (not shown) in order to collapse the first sub carrier signal power into a single energy peak.

In one embodiment, during the subsequent acquisition of the hub carrier during the direct burst transmission by the first the sub carrier tracking loop, a residual first sub-hub frequency offset between a subsequent first sub-hub frequency offset and the initial first_sub-hub frequency offset is measured by using the first sub carrier loop. The residual first_sub-hub frequency offset is stored in a frequency accumulator 50 (of FIG. 1). The residual first_sub-hub frequency offset is used to resolve phase equivocation for the subsequent direct burst signal transmitted by the hub carrier tracking loop and received by the first sub carrier tracking loop.

Similarly, while performing the initial acquisition of the first sub carrier by the hub carrier tracking loop during the reverse burst transmission between the first sub carrier tracking loop and the hub carrier tracking loop, the hub measures the initial hub-first_sub frequency offset between the first sub carrier and the received first sub carrier using the same approach disclosed in the patent application #1. The initial hub-first_sub frequency offset is stored in the hub frequency register 48.

In one embodiment, if hub communicates with several subs, the different frequency offsets are stored in different memory cells in the same block 48. Again, the initial frequency estimation of the hub-first_sub frequency offset can be done by using a differential symbol phase measurement technique disclosed in the patent application #1.

In an alternative embodiment, the step of performing the initial frequency estimation of the first_sub-hub frequency offset is done by performing the following steps: (1) performing a nonlinear operation to raise the first sub carrier signal into "ℵ" power, in order to obtain a nonlinear ℵ_first_sub_carrier signal; and (2) performing a Fast Fourier Transform (FFT) on the nonlinear ℵ_first_sub_carrier signal. "ℵ" is equal to the number of plant points in the first sub QAM constellation.

In one embodiment, whereas there is sufficient number of symbols in the first sub carrier PREAMBLE, the prior modulation performed before FFT is performed doesn't affect the FFT operation itself because the first sub carrier PREAMBLE has enough symbols so that the hub circuitry can make a meaningful decision.

In an alternative embodiment, whereas the sufficient number of symbols in the first sub carrier PREAMBLE is lacking, to perform a meaningful FFT operation the hub circuitry needs to perform a nonlinear operation to get rid of modulation and to remove the first sub carrier and all the phase data and to collapse all first sub symbols into one energy peak which would allow the FFT to perform a fast and meaningful first sub carrier frequency determination.

In one embodiment, the nonlinear operation to raise the first sub carrier signal into "ℵ" power is performed by using a multiplier (not shown).

For example, if a first sub carrier tracking loop comprises a QAM first sub carrier tracking loop, and if a hub carrier tracking loop further comprises a QAM hub carrier tracking loop, and if first sub QAM constellation comprises a QPSK constellation, ℵ=4, and the first sub carrier signal is raised into "ℵ=4" power by using a complex multiplier (not shown) in order to collapse the first sub carrier signal power into a single energy peak.

In one embodiment, the subsequent acquisition of the first sub carrier by the hub carrier tracking loop during the reverse burst transmission between the first sub carrier tracking loop and the hub carrier tracking loop, the residual hub-first sub frequency offset between the subsequent hub-first_sub frequency offset and the initial hub-first_sub frequency offset is measured by using the hub carrier loop, and stored in the hub frequency accumulator 50. The residual hub-first_sub frequency offset is further used by the phase equivocation circuit 12 of the hub to resolve phase equivocation for the subsequent reverse burst signal transmitted by the first sub. These steps are preferably repeated for each active sub that communicates with hub.

In one embodiment, the burst transmission network management system (for instance, a TDMA management system) is configured to transmit a protocol for each sub carrier tracking loop and for the hub carrier tracking loop (not shown). The protocol is configured to set the precise timing parameters for each direct burst communication between the hub carrier tracking loop and each sub carrier tracking loop, and each reverse burst communication between each sub carrier tracking loop and the hub carrier tracking loop. If this is the case, the reverse burst signals from each sub carrier tracking loop to the hub carrier tracking loop do not overlap in time.

In one embodiment of the present invention, to achieve the fast communication between the hub carrier loop and the plurality of sub carrier tracking loops, the residual hub-first_sub frequency offset stored in block 50 is used to determine a first residual hub-first sub phase offset while the hub carrier tracking loop performs tracking of the first sub carrier. The first residual hub-first_sub phase offset is stored in the hub phase accumulator 52.

In one embodiment, the first residual hub-first_sub phase offset is replaced in the hub phase accumulator 52 during an acquisition by the hub carrier tracking loop of the second subsequent reverse burst transmission from the first sub. In one embodiment, this is done by the hub control processor (not shown) that uses a precise timing device that calculates the number of symbol lapsed between the first and the second subsequent reverse burst transmission from the first sub and received by the hub carrier tracking loop. The substantially fast and substantially sufficient lock of the hub carrier tracking loop on the first sub carrier during second subsequent reverse burst transmission from the first sub can be achieved by using the first residual hub-first_sub frequency offset stored in block 48 and the replaced first residual hub-first_sub phase offset stored in block 52. These steps are preferably repeated for each next subsequent reverse burst transmission from the first sub carrier tracking loop. These steps are also repeated for each reverse burst communication between each active sub and the hub.

In one embodiment, the residual hub-first_sub phase offset stored in the phase accumulator 52 is replaced during subsequent acquisition of the first sub carrier by the hub by calculating the number of missed symbols during a burst off time between two subsequent reverse burst transmissions from the first sub carrier tracking loop.

In one embodiment, this calculation can be done by using hardware means, for instance, using a multiplier (not shown) to calculate the number of missed symbols during a burst off time between two subsequent reverse burst transmissions from the first sub carrier tracking loop. In another embodiment, this calculation can be done by using software means, for instance, using a table (not shown) and a processor (not shown) to predict the number of missed symbols during a burst off time between two subsequent reverse burst transmissions from the first sub carrier tracking loop.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a system comprising a subscriber (sub) carrier tracking loop and a hub carrier tracking loop, said hub carrier tracking loop comprising a burst modem, said sub carrier tracking loop comprising a burst modem, a method for resolving phase equivocation in a set of incoming symbols being received by said sub carrier tracking loop, said set of incoming symbols being transmitted from said hub carrier tracking loop; said method comprising the steps of:
   (A) acquiring a phase and a frequency of a hub carrier frequency by utilizing said sub carrier tracking loop;
   (B) estimating an instant absolute frequency offset between a received symbol point and a corresponding plant point;
   (C) averaging said instant absolute frequency offset over a plurality of received symbols;
   (D) storing said averaged estimated frequency offset in a frequency register of said sub carrier tracking loop;
   (E) locking said sub carrier tracking loop on said hub carrier frequency by compensating for said stored averaged estimated frequency offset;
   (F) estimating an instant absolute phase error between a received symbol point and a corresponding plant point;
   (G) averaging said instant absolute phase error over a plurality of received symbols;
   (H) resolving phase equivocation by adjusting said averaged absolute phase error, if said averaged absolute phase error is at least equal to a predetermined equivocation phase threshold; and
   (I) completing the tracking of said hub carrier frequency by said locked sub carrier tracking loop.

2. The method of claim 1, wherein said step (G) of averaging said instant absolute phase error between each said received symbol point and said corresponding plant point further includes the step of:
   (G1) performing a moving averaging operation over a plurality of N symbol points, N being an integer, by using a moving averaging filter.

3. The method of claim 2, wherein said step (G1) of performing said moving averaging operation over said plurality of N symbol points further includes the step of:
   (G1, 1) receiving an evaluation command from a host controller to start computing said averaged absolute phase error at the predetermined time during the direct burst transmission from said hub carrier tracking loop to said sub carrier tracking loop.

4. The method of claim 1, wherein said step (H) of resolving phase equivocation by adjusting said averaged absolute phase error, if said averaged absolute phase error is at least equal to said predetermined equivocation phase threshold further includes the steps of:
   (H1) determining said-dependent equivocation phase threshold;
   (H2) making a decision regarding a relationship between said averaged absolute phase error and said predetermined-dependent equivocation phase threshold; and
   (H3) if said averaged absolute phase error is at least equal to said predetermined equivocation phase threshold, injecting a phase offset signal into said carrier tracking loop in order to shift the phase of each said received symbol point away from the phase of a corresponding plant point by said phase offset signal.

5. The method of claim 4, wherein said step (H3) of injecting said offset phase signal further includes the step of:
   (H3,1) injecting a programmable phase offset signal into said carrier tracking loop in order to shift the phase of each said received symbol point away from the phase of said corresponding plant point beyond a programmable equivocation phase threshold.

6. The method of claim 1 further including the step of:
   keeping substantially precise timing in order to substantially precisely determine a time instance of a burst back transmission from said sub carrier tracking loop to said hub carrier tracking loop.

7. In a system comprising a hub carrier tracking loop and at least one sub carrier tracking loop, said hub carrier tracking loop comprising a burst modem, each said sub carrier tracking loop comprising a burst modem, a method of fast carrier acquisition of a hub carrier by at least one said sub carrier tracking loop; said method further comprising the steps of:
   (A) performing an initial acquisition of a hub carrier by a first sub carrier tracking loop during a direct burst transmission from said hub carrier tracking loop;
   (B) performing a subsequent acquisition of said hub carrier during said direct burst transmission by said first sub carrier tracking loop using a first_sub-hub frequency offset determined during said step (A);
   (C) performing an initial acquisition of said first sub carrier by said hub carrier tracking loop during a reverse burst transmission between said first sub carrier tracking loop and said hub carrier tracking loop;

(D) performing a subsequent acquisition of said first sub carrier by said hub carrier tracking loop during said reverse burst transmission between said first sub carrier tracking loop and said hub carrier tracking loop using a hub-first_sub frequency offset determined during said step (C); and (E) repeating said steps (A–D) for each communication between said hub carrier tracking loop and each said "k" sub carrier tracking loop, k being an integer greater than one.

8. The method of claim 7, wherein said first sub carrier tracking loop comprises a first sub frequency register, and wherein said step (A) of performing said initial acquisition of said hub carrier during said direct burst transmission by said first said sub carrier tracking loop further includes the steps of:

performing an initial frequency estimation of a first_sub-hub frequency offset between said hub carrier and said received hub carrier by said first sub carrier tracking loop; and storing said initial first_sub-hub frequency offset in said first sub frequency register.

9. The method of claim 8, wherein said step of performing said initial frequency estimation of said first_sub-hub frequency offset further includes the step of:

using a differential symbol phase measurement technique.

10. The method of claim 8, wherein said wherein said first sub carrier tracking loop comprises a QAM first sub carrier tracking loop, wherein said hub carrier tracking loop further comprises a QAM hub carrier tracking loop, and wherein said step of performing said initial frequency estimation of said first_sub-hub frequency offset further includes the steps of:

performing a nonlinear operation to raise said first_sub carrier signal into "ℵ" power, in order to obtain a nonlinear ℵ_first-sub_carrier signal; and performing a Fast Fourier Transform (FFT) on said nonlinear ℵ_first_sub_carrier signal;

wherein "ℵ" is equal to a number of said plant points in said first_sub QAM constellation.

11. The method of claim 7, wherein said first sub carrier tracking loop comprises a first sub frequency accumulator, and wherein said step (B) of performing said subsequent acquisition of said hub carrier during said direct burst transmission by said first said sub carrier tracking loop further includes the steps of:

(B1) measuring a residual first_sub-hub frequency offset between a subsequent first_sub-hub frequency offset and said initial first_sub-hub frequency offset by using said first sub carrier loop;

(B2) storing said residual first_sub-hub frequency offset in said first sub frequency accumulator; and (B3) using said residual first_sub-hub frequency offset to resolve phase equivocation for a subsequent direct burst signal transmitted by said hub carrier tracking loop and received by said first sub carrier tracking loop.

12. The method of claim 7, wherein said hub carrier tracking loop comprises a hub frequency register, and wherein said step (C) of performing said initial acquisition of said first sub carrier by said hub carrier tracking loop during said reverse burst transmission between said first sub carrier tracking loop and said hub carrier tracking loop further includes the steps of:

(C1) measuring an initial hub-first_sub frequency offset between said first sub carrier and said received first sub carrier by said hub carrier tracking loop; and (C2) storing said initial hub-first_sub frequency offset in said hub frequency register.

13. The method of claim 12, wherein said step (C1) of performing said initial frequency estimation of said hub-first_sub frequency offset further includes the step of:

using a differential symbol phase measurement technique.

14. The method of claim 12, wherein said first sub carrier tracking loop comprises a QAM first sub carrier tracking loop, wherein said hub carrier tracking loop further comprises a QAM hub carrier tracking loop, and wherein said step (C1) of measuring said initial hub-first_sub frequency offset between said first sub carrier and said received first sub carrier by said hub carrier tracking loop further includes the steps of:

performing a nonlinear operation to raise said first sub carrier signal into "ℵ" power, in order to obtain a nonlinear ℵ_first_sub_carrier signal; and performing a Fast Fourier Transform (FFT) on said nonlinear ℵ_first_sub_carrier signal;

wherein "ℵ" is equal to a number of said plant points in said first sub QAM constellation.

15. The method of claim 12 further including the step of:

repeating said steps (C1–C2) for each said "k" sub carrier tracking loop transmitting a reverse burst signal to said hub carrier tracking loop, k being an integer greater than one.

16. The method of claim 7, wherein said hub carrier tracking loop comprises a hub frequency accumulator, wherein said step (D) of performing said subsequent acquisition of said first sub carrier by said hub carrier tracking loop during said reverse burst transmission between said first sub carrier tracking loop and said hub carrier tracking loop further includes the steps of:

(D1) measuring a residual hub-first_sub frequency offset between a subsequent hub-first_sub frequency offset and said initial hub-first_sub frequency offset by using said hub carrier loop;

(D2) storing said residual hub-first_sub frequency offset in said hub frequency accumulator; and (D3) using said residual hub-first_sub frequency offset to resolve phase equivocation for a subsequent reverse burst signal transmitted by said first sub carrier tracking loop and received by said hub carrier tracking loop.

17. The method of claim 16 further including the step of:

repeating said steps (D1–D3) for each said "k" sub carrier tracking loop transmitting a reverse burst signal to said hub carrier tracking loop, k being an integer greater than one.

18. The method of claim 7 further including the step of:

utilizing a network management system configured to transmit a protocol for each said sub carrier tracking loop and for said hub carrier tracking loop, wherein said protocol sets the precise timing parameters for each said direct burst communication between said hub carrier tracking loop and each said sub carrier tracking loop; and wherein said protocol sets the precise timing parameters for each said reverse burst communication between each said sub carrier tracking loop and said hub carrier tracking loop; and wherein said reverse burst signals from each said sub carrier tracking loop to said hub carrier tracking loop do not overlap in time.

19. In a system comprising a hub carrier tracking loop and a plurality of sub carrier tracking loops, said hub carrier tracking loop comprising a burst modem, a hub frequency register, a hub frequency accumulator, and a hub phase accumulator; each said sub carrier tracking loop comprising a burst modem, a sub frequency register, a sub frequency accumulator, and a sub phase accumulator; a method of fast communication between said hub carrier loop and at least one said sub carrier tracking loop; said method further comprising the steps of:

(A) determining an initial hub-first_sub frequency offset and an initial hub-first_sub phase offset during initial acquisition by said hub carrier tracking loop of an initial reverse burst transmission from said first sub carrier tracking loop;

(B) storing said initial hub-first_sub frequency offset in said hub frequency register;

(C) if said initial hub-first sub phase offset is at least equal to an equivocation threshold, making an initial phase adjustment to resolve said initial phase equivocation;

(D) achieving a substantially fast and substantially sufficient lock of said hub carrier tracking loop on said first sub carrier by using said initial hub-first_sub frequency offset and said initial phase adjustment;

(E) determining a first residual hub-first_sub frequency offset during acquisition by said hub carrier tracking loop of a first subsequent reverse burst transmission from said first sub carrier tracking loop;

(F) storing said first residual hub-first_sub frequency offset in said hub frequency accumulator;

(G) using said residual hub-first_sub frequency offset to achieve a substantially sufficient tracking by said hub carrier tracking loop of said first sub carrier;

(H) determining a first residual hub-first_sub phase offset while said hub carrier tracking loop performs tracking of said first sub carrier;

(I) storing said first residual hub-first_sub phase offset in said hub phase accumulator;

(K) replacing said first residual hub-first_sub phase offset in said hub phase accumulator during an acquisition by said hub carrier tracking loop of a second subsequent reverse burst transmission from said first sub carrier tracking loop using a control processor that uses a precise timing device that calculates the number of symbol lapsed between said first and said second subsequent reverse burst transmission from said first sub carrier tracking loop and received by said hub carrier tracking loop;

(L) achieving a substantially fast and substantially sufficient lock of said hub carrier tracking loop on said first sub carrier during second subsequent reverse burst transmission from said first sub carrier tracking loop by using said first residual hub-first_sub frequency offset and said replaced first residual hub-first_sub phase offset;

(M) repeating said steps (E–K) for each said next subsequent reverse burst transmission from said first sub carrier tracking loop; and (N) repeating said steps (A–M) for each reverse burst communication between each said "k" sub carrier tracking loop and said hub carrier tracking loop; k being an integer greater than one.

20. The method of claim 19, wherein said step (K) of replacing said first residual hub-first_sub phase offset in said hub phase accumulator during acquisition of said first sub carrier by said hub carrier tracking loop further includes the step of:

calculating the number of missed symbols during a burst off time between two subsequent reverse burst transmissions from said first sub carrier tracking loop.

21. The method of claim 19, wherein said step (K) of replacing said first residual hub-first_sub phase offset in said hub phase accumulator during acquisition of said first sub carrier by said hub carrier tracking loop further includes the step of:

using a hardware means to calculate the number of missed symbols during a burst off time between two subsequent reverse burst transmissions from said first sub carrier tracking loop.

22. The method of claim 19, wherein said step (K) of replacing said first residual hub-first_sub phase offset in said hub phase accumulator during acquisition of said first sub carrier by said hub carrier tracking loop further includes the step of:

using a multiplier to calculate the number of missed symbols during a burst off time between two subsequent reverse burst transmissions from said first sub carrier tracking loop.

23. The method of claim 19, wherein said step (K) of replacing said first residual hub-first_sub phase offset in said hub phase accumulator during acquisition of said first sub carrier by said hub carrier tracking loop further includes the step of:

using a software means to predict the number of missed symbols during a burst off time between two subsequent reverse burst transmissions from said first sub carrier tracking loop.

24. The method of claim 19, wherein said step (K) of replacing said first residual hub-first_sub phase offset in said hub phase accumulator during acquisition of said first sub carrier by said hub carrier tracking loop further includes the step of:

using a table and a processor to predict the number of missed symbols during a burst off time between two subsequent reverse burst transmissions from said first sub carrier tracking loop.

25. An apparatus for resolving phase equivocation in a set of incoming symbols by a sub carrier tracking loop, said apparatus comprising:

(A) a means for acquiring a phase and a frequency of a hub carrier frequency;

(B) a means for estimating an averaged frequency offset averaged over a plurality of received symbols;

(C) a means for storing said averaged estimated frequency offset;

(D) a means for estimating an absolute phase error between each said received symbol point and a corresponding plant point;

(E) a means for performing an averaging operation on said absolute phase error between each said received symbol point and said corresponding plant point;

(F) a means for performing a phase adjustment; and (G) a means for performing a tracking operation of said carrier frequency.

26. The apparatus of claim 25, wherein said means for storing said averaged estimated frequency offset further includes:

a frequency register; wherein said averaged estimated frequency offset is used in order to lock said sub carrier tracking loop on said hub carrier frequency and to stop the rotation of said plurality of received symbols.

27. The apparatus of claim 25, wherein said means for performing said averaging operation on said absolute phase error between each said received symbol point and said corresponding plant point further includes:
- a moving averaging filter configured to perform said averaging operation on said absolute phase error between each said received symbol point and said corresponding plant point for a plurality of last N received symbol points, N being an integer, upon receiving said evaluation command, from said host controller to compute the averaged absolute phase error at predetermined time in the burst transmission.

28. The apparatus of claim 25, wherein said means for performing said phase adjustment further includes:
- a means for determining said equivocation phase threshold, wherein said equivocation phase threshold is constellation dependent;
- a means for making a decision regarding the relationship between said averaged absolute phase error and said predetermined-dependent equivocation phase threshold; and
- a means for injecting a phase offset signal into said carrier tracking loop in order to shift the phase of a first_after_decision symbol point received after said decision regarding the relationship between said averaged absolute phase error and said predetermined-dependent equivocation phase threshold has been made, wherein said phase of said first_after_decision symbol point is shifted away from the phase of a corresponding plant point beyond said predetermined equivocation phase value; if said averaged absolute phase error is less than said predetermined equivocation phase threshold.

29. The apparatus of claim 25, wherein said means for performing said phase adjustment further includes:
- a equivocation "push" decision logic circuit configured to decide whether said averaged phase error over the last N received symbols is greater than said predetermined equivocation phase threshold; and
- a phase equivocation generator configured to generate and inject a phase "push" value in said received symbol point, wherein said phase "push" value is sufficient high in order to "push" said symbol point towards a selected plant point.

30. The apparatus of claim 29, wherein said phase equivocation generator further includes:
- a means for injecting a programmable phase offset signal into said carrier tracking loop in order to shift the phase of said first_after_decision symbol point away from the phase of said corresponding plant point beyond said programmable equivocation phase value.

31. The apparatus of claim 30, wherein said phase equivocation generator further includes:
- a programmable phase offset generator configured to generate a programmable signal into said carrier tracking loop in order to shift the phase of said first_after_decision symbol point away from the phase of said corresponding plant point beyond said programmable equivocation phase value.

32. The apparatus of claim 25 further including:
- a timing device configured to keep substantially precise timing by said sub carrier tracking loop in order to substantially precisely determine a time instance of a burst back transmission from said sub carrier tracking loop to said hub carrier tracking loop.

33. An apparatus for fast communication between a hub carrier tracking loop and a plurality of sub carrier tracking loops; said apparatus further comprising:
- a means for measuring a plurality of "k" initial hub-k-th-sub frequency offsets during a first reverse burst transmission from each said "k"-sub to said hub carrier tracking loop; k is an integer;
- a means for storing said plurality of "k" initial hub-k-th-sub frequency offsets;
- a means for measuring a plurality of "k" residual hub-k-th-sub frequency offsets during a subsequent reverse burst transmission from each said "k"-sub to said hub carrier tracking loop;
- a means for storing said plurality of "k" residual hub-k-th-sub frequency offsets;
- a means for determining a plurality of "k" of hub-k-th-sub residual phase offsets by using said plurality of initial hub-k-th-sub frequency offsets and said plurality of residual hub-k-th-sub frequency offsets; and
- a means for storing said plurality of "k" residual hub-k-th-sub phase offsets.

34. The apparatus of claim 33, wherein said means for storing said plurality of initial hub-k-th-sub frequency offsets further includes:
- a hub frequency register.

35. The apparatus of claim 33 further including:
- a network management system configured to transmit a protocol for each said sub carrier tracking loop and for said hub carrier tracking loop, wherein said protocol sets the precise timing parameters for each said direct burst communication between said hub carrier tracking loop and each said sub carrier tracking loop; and wherein said protocol sets the precise timing parameters for each said reverse burst communication between each said sub carrier tracking loop and said hub carrier tracking loop; and wherein said reverse burst signals from each said sub carrier tracking loop to said hub carrier tracking loop do not overlap in time.

36. An apparatus for fast communication between a hub carrier tracking loop and a plurality of sub carrier tracking loops, said hub carrier tracking loop comprising a burst modem, a hub frequency accumulator, and a hub phase accumulator; each said sub carrier tracking loop comprising a burst modem, said apparatus comprising:
- a means for determining an initial hub-k-th-sub frequency offset during an acquisition by said hub carrier tracking loop of a preceding reverse burst transmission from said "k"-th sub carrier tracking loop;
- a means for determining an initial hub-k-th-sub phase offset during an acquisition by said hub carrier tracking loop of a preceding reverse burst transmission from said "k"-th sub carrier tracking loop;
- a means for storing said preceding hub-k-th-sub frequency offset;
- a means for storing said preceding hub-k-th-sub phase offset; and
- a means for restoring and using each said preceding hub-k-th-sub phase for subsequent reverse burst transmission from one said "k" sub carrier tracking loop.

37. The apparatus of claim 36, wherein said means for restoring and using each said preceding hub-k-th-sub phase for subsequent reverse burst transmission from one said "k" sub carrier tracking loop further includes:
- a processor configured to calculate for said "k" sub carrier tracking loop the timing interval between the start transmission time and the stop transmission time for said preceding burst.

38. The apparatus of claim 36, wherein said means for restoring and using each said preceding hub-k-th-sub phase for subsequent reverse burst transmission from one said "k" sub carrier tracking loop further includes:

a logic circuit configured to test whether said timing interval between the start transmission time and the stop transmission time for said preceding burst is equal to said integer number of transmitted symbols.

39. The apparatus of claim 36, wherein said means for restoring and using each said preceding hub-k-th-sub phase for subsequent reverse burst transmission from one said "k" sub carrier tracking loop further includes:

a predicting means configured to restore each said preceding hub-k-th-sub phase for subsequent reverse burst transmission from one said "k" sub carrier tracking loop based on a predicted phase value.

40. The apparatus of claim 39 wherein said predicting means further includes:

a means for calculating a number of symbols transmitted from said sub carrier tracking loop to said hub loop during said preceding reverse burst transmission.

41. The apparatus of claim 39, wherein said predicting means further includes:

a processor configured to calculate a number of symbols transmitted from said sub carrier tracking loop to said hub during said preceding reverse burst transmission.

* * * * *